March 15, 1932.  W. McKEAGE  1,849,500
JACK
Filed March 13, 1930   2 Sheets-Sheet 2
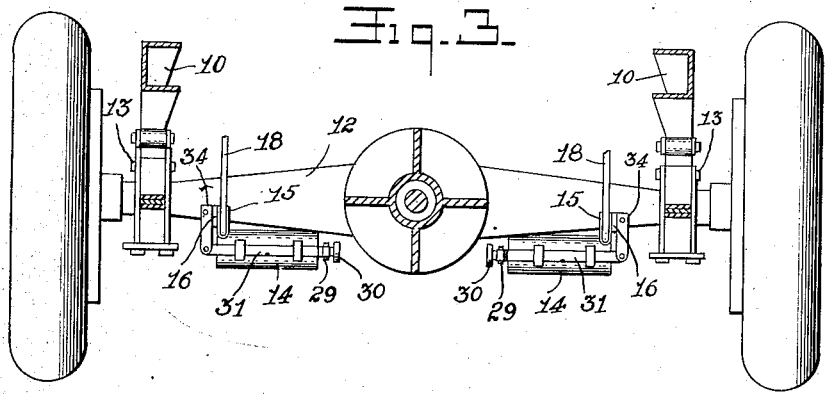
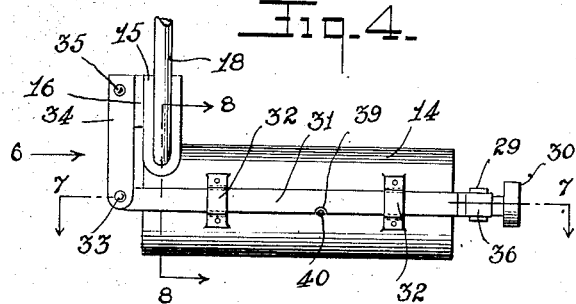
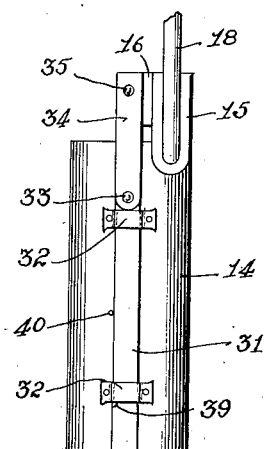
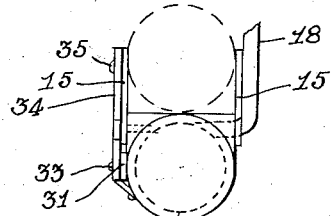
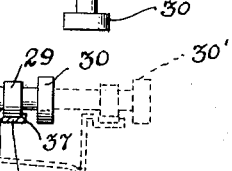
INVENTOR
William McKeage
BY
Joshua R H Potts
ATTORNEY Patented Mar. 15, 1932

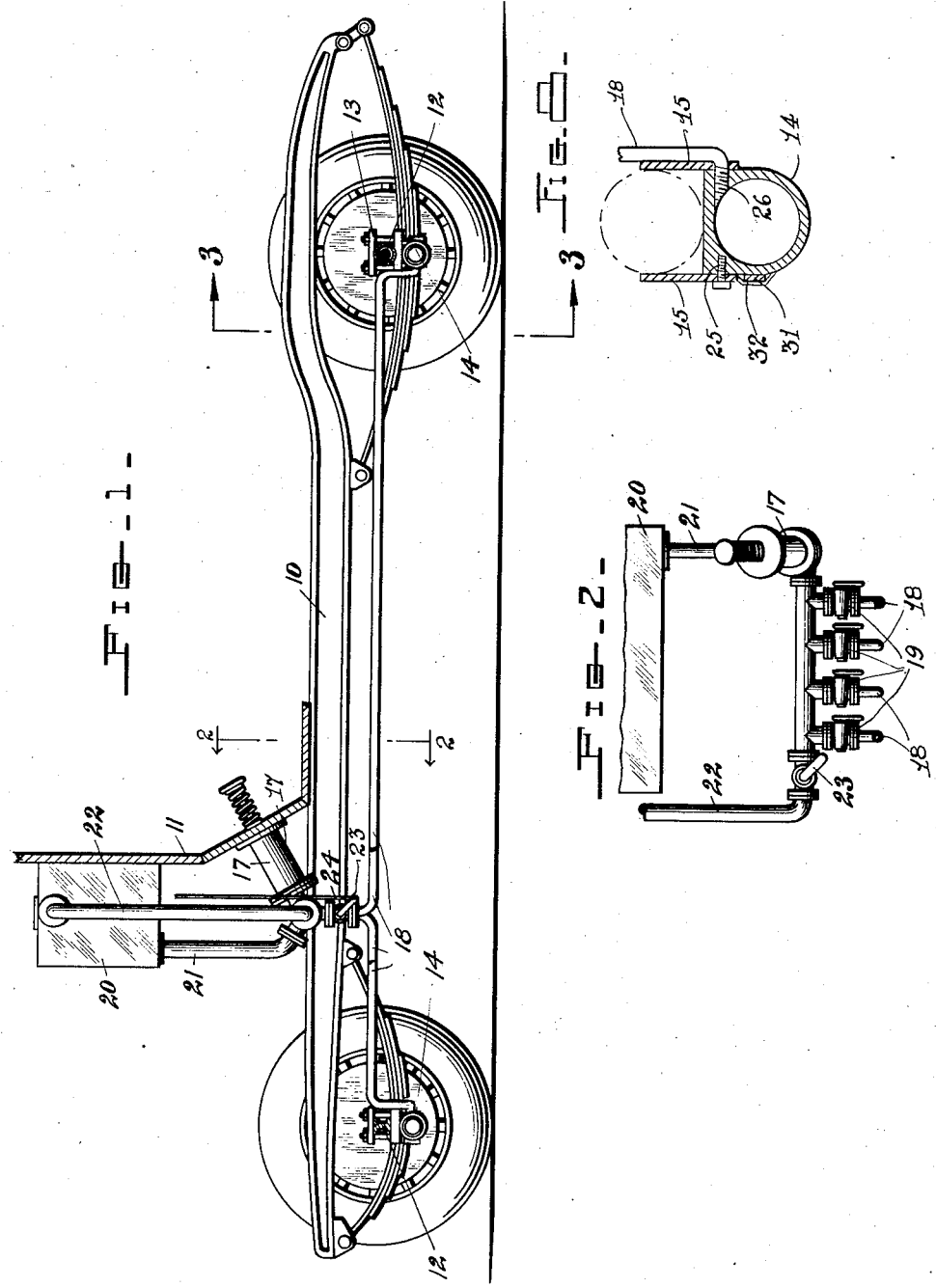

1,849,500

UNITED STATES PATENT OFFICE

WILLIAM McKEAGE, OF PHILADELPHIA, PENNSYLVANIA

JACK

Application filed March 13, 1930. Serial No. 435,595.

This invention relates to jacks and has for an object to provide a jack especially adapted to be permanently attached to a vehicle and to be actuated, both as to moving into operative position and to lifting by compressed fluid.

A further object of the invention is to provide a jack especially, though not necessarily, designed for use, one adjacent to each wheel of a vehicle, adapted to be operated by fluid under pressure with means carried upon the vehicle itself for generating the fluid pressure.

A further object of the invention is to provide a jack, permanently attached to the axle of a vehicle, and normally, when in inoperative position, folded upwardly beneath the axle with means for automatically folding the jack downwardly to operative position and operating to lift, when fluid pressure is applied.

A further object of the invention is to provide a jack, adapted to be attached to the axle of a vehicle, with improved means for controlling, not only the lifting agencies of the jack but also to automatically move the jack from inoperative to operative position when fluid pressure is applied and return from operative to inoperative position when the fluid pressure is released.

A further object of the invention is to provide the necessary and desirable mechanical features for carrying into effect the above stated objects.

In the drawings:

Figure 1 is a view of a conventional motor vehicle chassis with the axles shown in transverse section longitudinally of the chassis and showing a pair of the jacks attached thereto and folded to inoperative position, Figure 2 is a detail view of the fluid controlling means taken on line 2—2 of Figure 1, Figure 3 is a vertical sectional view transversely of the vehicle in parallelism of one of the axles taken on line 3—3 of Figure 1, Figure 4 is a view of the jack in side elevation shown in inoperative position, Figure 5 is a view of the jack in side elevation in operative position.

Figure 6 is a view of the jack in end elevation as indicated by arrow 6, of Figure 4 showing an axle in dotted lines, Figure 7 is a longitudinal diametrical sectional view through the jack taken on line 7—7 of Figure 4, and Figure 8 is a transverse sectional view through the jack and its supporting means taken on line 8—8 of Figure 4.

Like characters of reference indicate corresponding parts throughout the several views.

As illustrated in the drawings, and merely for illustration and not for limiting purposes, the frame 10 of the automobile or like structure is shown provided with a dash 11, and axles 12 of substantially the usual and ordinary type. The axles 12 are supported by shackles 13 in the usual manner.

Beneath the axles 12, the jacks 14 are suspended in any convenient manner as by carrier straps 15 carrying the brackets 16.

Mounted in any convenient place upon the chassis is a compression mechanism indicated, merely for illustration, by the foot pump 17 which supplies fluid pressure through the pipes 18, to the cylinder of the jack 14, as will be hereinafter more fully described. These pipes 18 are each controlled by a valve 19. Mounted also at any convenient place upon the body is a compression tank 20, with a pipe 21 leading from the compression mechanism 17, to said tank and with a pipe 22 leading from said tank to the valve 23 which is the main control valve for locking the pressure within the tank 20. These valves 19 are controlled by any convenient manual mechanism, illustrated merely, by the rods 24 which extends upwardly therefrom and are broken, indicating that they may extend to any desired point. The cylinders of the jack 14 are pivoted to the hangers 15 by any mechanically approved means as by the pintle 25 and the inwardly extending end 26 of the supply pipe 18 so that the cylinder is free to swing from the position shown at Figures 1, 3 and 4 to the position shown at Figure 5 about these supporting pivots.

Mounted within the cylinder is a piston 27 having a piston rod 28 extending outwardly with a collar 29, and foot 30, the latter being designed to engage the ground or other underlying support.

Along the cylinder a bar 31 is mounted to slide and held by the straps 32. It is obvious that for different sides of the vehicle and different locations, it will be preferable to construct these jacks with oppositely located bars 31 and associated parts and showing the device, therefore as at Figure 3, will be no departure from the invention. The bar 31 is pivotally connected at 33 with a link 34 which in turn is pivoted to the brackets 16.

The bar 31 is provided with a return bend 36, preferably contoured to engage both opposite sides of the collar 29 as shown more particularly at Figure 7. This provides a shoulder 37 against which the collar 29 will engage on its outward movement and a shoulder 38 against which the collar will engage upon its return movement. It will be noted especially by reference to Figure 7, that the shoulder 38 is deeper than the shoulder 37 for the reasons which will be hereinafter made clear. The bar 31 is also provided with a notch 39 upon one edge actuated by the resiliency of the material itself to engage a pin 40 when the jack has been swung to inoperative position as shown at Figure 4 and to assist in supporting the jack in such inoperative position.

In operation with the parts assembled as shown at Figure 7, fluid pressure admitted to the cylinder back of the piston 27 will cause said piston to move outwardly along said cylinder against the resistance of the spring 41, if such spring is employed, which is considered merely an auxiliary. The movement of the piston carries therewith the collar 29, which being in engagement with the shoulder 37, moves the bar 31 and through the connection of the link 34, swings the cylinder from the inoperative or horizontal position shown at Figure 4, to the vertical or operative position shown at Figure 5. To assist in the operation merely, a cam 42 is supplied on the exterior of the cylinder on the end so that as the bar 31 moves outwardly under the impetus of the collar 29 it also swings away from the collar 29 as shown in dotted lines at Figure 7 until the shoulder 37 finally releases the collar 29, permitting the piston and foot 30 to move downwardly to operate as a jack. Upon the return movement the shoulder 38, being wider than the shoulder 37, the collar 29 will again engage the shoulder 38 and by the opposite action will fold the cylinder to the inoperative or horizontal position shown at Figure 4, whereupon the notch 39 will automatically catch the pin 40 and assist in maintaining the device in folded or inoperative position.

It will be obvious from the foregoing description that any one of the jacks attached to the vehicle may be electively operated by manually operating the rod 24 which will open the particular valve 19, controlling passage to the particular pipe 18 which supplies fluid pressure from the tank 20 to the particular jack which it is desired to operate.

After the jack has performed its function it is returned to folded position by the exhaust within the cylinder which may be produced by first depressing the pressure mechanism 17, then closing the valve 23 and then releasing the pressure mechanism while the valve 19 is still open. This will provide an attenuation of the fluid within the cylinder so that the external atmosphere acting upon the piston will tend to return it to normal.

Of course, the jack herein illustrated may be modified in various ways without departing from the invention herein set forth and hereinafter claimed.

The invention is hereby claimed as follows:—

1. A jack comprising a cylinder, a piston mounted within the cylinder, means to hingedly attach the cylinder to the axle of a vehicle, means to supply fluid under pressure to the cylinder, means connecting the piston with the axle whereby the initial movement of the piston will swing the cylinder upon its hinge, and a ground engaging foot carried by the piston.

2. A jack comprising a cylinder, a piston mounted to reciprocate within the cylinder and having a piston rod extending therewithout and provided with a foot, means to hingedly connect the cylinder to the axle of a vehicle, a source of fluid pressure connected with said cylinder, a member sliding along said cylinder and engaged by the piston rod, and a link connecting the said sliding member with said axle adapted to swing said cylinder upon said hinge.

3. A jack comprising a cylinder, a piston mounted to reciprocate within the cylinder, a piston rod extending without the cylinder and provided with a foot, a collar intermediate the foot and the cylinder, a member sliding along the cylinder and having shoulders in engagement with the collar and a link connecting the sliding member with the axle adapted to swing the cylinder upon its hinge from the movement of the piston.

4. A jack comprising a cylinder, means hinging the cylinder to the axle of a vehicle, a piston mounted to reciprocate within the cylinder, a piston rod extending outwardly through the end of the cylinder and provided at its extremity with a foot and with a collar intermediate the foot and the cylinder, a bar mounted to slide longitudinally along the cylinder and provided with spaced shoulders engaging upon opposite sides of the collar, a link connecting the said bar with the axle adapted to swing the cylinder upon its hinge and a fluid compression mechanism in communication with the cylinder.

5. A jack comprising a cylinder hingedly connected with the axle of a vehicle, a piston mounted to reciprocate within the cylinder, a piston rod extending without the cylinder, a foot formed upon the extremity of the piston rod, a collar formed upon the piston rod intermediate the foot and the cylinder, a bar mounted to slide along the cylinder and provided intermediate its length with a notch, an offset carried by the bar, shoulders carried by the offset spaced for engagement upon opposite faces of the collar, a link connecting the bar with the axle and adapted to swing the cylinder upon its hinge with the advance of the piston, means to supply fluid pressure to the cylinder and a pin carried by the cylinder positioned for engagement within the notch of the bar when the cylinder is in upfolded position.

In testimony whereof I have signed my name to this specification.

WILLIAM McKEAGE.